United States Patent Office 3,063,892
Patented Nov. 13, 1962

3,063,892
PREPARATION OF HIDE FIBER
Frederic C. Merriam, Danvers, and Robert A. Whitmore, Beverly, Mass., assignors to United Shoe Machinery Corporation, Boston, Mass., a corporation of New Jersey
No Drawing. Filed Oct. 14, 1959, Ser. No. 846,254
2 Claims. (Cl. 162—2)

This invention relates to an improvement in methods for separating skin and hide material into collagen fibers.

The application of John H. Highberger and Robert A. Whitmore, Serial No. 691,728, filed Oct. 22, 1957, entitled Collagen Fiber Masses and Methods of Making the Same, now United States Patent No. 2,934,447, issued April 26, 1960, teaches the manufacture of interlocked fiber masses similar to natural skin by separating skin material into its constituent collagen fibers, combining these fibers with a solution of collagen, shaping the mixture and precipitating collagen fibers from the collagen solution to lock the existing fibers together. Separation of the skin and hide material into its constituent collagen fibers as disclosed in that application is accomplished by chemically treating the skin or hide to inhibit hydration of the fibers, placing the skin in water and teasing the skin into fibers suspended in the water.

The fiber separation procedure disclosed in the above application is effective to separate the skin or hide into its fibers but the procedure is time consuming, particularly as regards the disintegration step and the step of removing water from the fiber suspension to provide a fiber mass suitable for combination with the collagen solution.

The application of Robert A. Whitmore, Serial No. 707,736, filed Jan. 8, 1958, entitled Improvements in Smoke Filters, discloses the use of collagen fibers in a filtering system for removing tars, nicotine and other undesired components from tobacco smoke. As pointed out in that application, collagen fibers are constituted of a complex combination of amino acid units providing a large number of polar groups, specifically amine and carboxyl groups, for action and reaction with tars, aldehydes, nicotine and other constituents of tobacco smoke. The active surface of the collagen fibers is relied on to combine chemically with the smoke components referred to so that they are not free to re-enter the stream of smoke and gases and pass through the filter. The fibers employed in the smoke filter are in general prepared by the same procedure used in the preparation of fibers for use in making interlocked collagen fiber masses as described in the first-mentioned application. In the smoke filter it is desirable that the number of active groups which have been combined with and inactivated by the chemical pretreatment of the skin or hide be kept as low as possible in order not to reduce the groups which are active in removing undesired components of the smoke.

It is an object of the present invention to provide a method for separating skin and hide into collagen fibers by a procedure which gives improved fiber separation and fiber quality and reduces the time required.

It is a further object of the invention to provide a method which both insures rapid dispersion of the collagen fibers of skin or hide and which gives a product having a minimum proportion of groups rendered inactive by chemical treatment.

It has now been found that collagen fiber may be obtained most effectively by controlled treatment of the skin or hide raw material with an aldehyde such as formaldehyde, glyoxal or glutaraldehyde and beating the treated material in water to reduce the hide to fibers suspended in water followed by dewatering the suspension. These operations are carried out under a special pH control effective to give improved combination of the aldehyde with the skin material to reduce the time required for formation of fibers and separation from water and to limit the proportion of chemically combined inactivated amino and carboxyl groups of the resultant fiber.

A simplified flow diagram of the process is as follows:

Collagen fiber source, e.g., animal skin trimmings, scraps

Adjust pH to 4.5 to 10.5

Aldehyde treatment to give combined aldehyde content of 0.15% to 1.0%

Adjust pH to 5–8

Mechanical beating in water to tease skin into fibers

Aqueous suspension of collagen fibers

Add surface active agent and introduce air bubbles into the dispersion

Skim off collagen fibers from surface

Nubbins and lumps to waste

Collagen fibers free from nubbins and lumps

Alternative where nubbins and lumps are few or not objectionable

Redisperse collagen fibers in water

Aqueous suspension of collagen fibers

Adjust pH to from 4 to 5.3

Drain off water

Water to waste

Press drained material

Water to waste

Collagen fiber

Further treatment e.g., drying, carding, etc. or use

Raw material for reduction to collagen fibers may be any skin or hide such as a limed unhaired hide, a pickled hide, or an unlimed hide. Cattle hide such as steer hide or cow hide is ordinarily used since other skins are less available and may contain excess grease, as in the case of sheepskin, which must be removed before use. A limed hide will be washed to remove lime with addition of acid, if necessary, to bring the pH to from about 4.5 to about 10.5 and preferably to a pH in the range of pH 5 to pH 9.5. Unlimed hide or pickled hide will normally be washed and treated with alkali to raise its pH to the desired value.

The raw material, either in the form of whole skins, splits, scraps or in subdivided condition, is then subjected to treatment with the aldehyde. Where the material is to provide collagen fibers for the manufacture of interlocked collagen fiber sheets, the pieces of raw material are preferably not smaller than about ¾″ although products useful for other purposes may be obtained with pieces as small as ¼″. Aldehyde treatment involves immersing the skin material in an aqueous bath of controlled pH containing a small percent, suitably ¼% to 1%, of aldehyde based on the weight of the bath. The skin or hide material is left in the bath long enough to provide from about 0.15% to preferably not over about 1% of combined aldehyde based on the dried weight of the fibrous material.

The pH value and the degree of subdivision affects the rate at which the aldehyde combines with the skin material. In general the rate of aldehyde combination increases with pH and reaches a fairly rapid but readily controllable rate at a pH of 9 to 10. At a pH over about 10.5 tanning is almost instantaneous and results in serious irregularity in amount of aldehyde combined with different portions of the skin. At lower pH values a greater percentage of aldehyde is required and tannage takes longer.

When the skin or hide material has been taken up the desired percentage of aldehyde, it is removed from the treating bath and introduced into a second aqueous bath where the pH of the mixture is brought to a pH in the range of 5 to 8, preferably 5 to 7. This bath will contain from about 1% to about 8%, preferably about 4% of skin or hide solids. Lower percentages of solids may be used but cause difficulties and inefficiencies. The bath containing the skin or hide material is then passed through one or more mechanical devices involving relatively moving surfaces which exert a shearing action for pulling or teasing the hide into its constituent fibers and forming a pulp or suspension of the fibers in water. Suitable devices are a beater similar to that used in making paper pulp, or a Jordan, or a plate mill in which the mixture is introduced between relatively moving, rough plates which tease the material into its constituent fibers. Where a plate mill is used it has been found desirable to complete the fiber separation treatment in a beater to avoid the "roping" effects sometimes encountered in a plate mill due to the twisting together of fibers.

The fiber suspension obtained may contain nubbins or small lumps particularly where the fibers are derived from a whole skin. It is believed that these nubbins come from the grain surface of the skin. The fibers may, optionally, be separated from the nubbins or lumps by flotation. This involves adding a detergent or surface active agent, preferably a nonionic agent, to the dispersion and introducing air bubbles into the dispersion. This may be done by spraying the surface with a high velocity water jet or using an air jet. The bubbles formed attach themselves to the fibers causing them to float while the nubbins and fines sink. The fibers are skimmed off after allowing the nubbins to settle for from one to five minutes. Ionic dispersing agents may be used in this connection if a neutral salt, e.g., NaCl, is first added to the fiber dispersion.

The skimmed off fibers are redispersed in water and the pH of the dispersion is adjusted by addition of acidic material to a pH of from about 4 to about 5.5, preferably about 4.8 to 5.3. It may be desirable to let this dispersion stand overnight to insure that the entire mass of fibers is brought to the desired pH. The dispersion is then placed on a screen of about 20 mesh and allowed to drain. The product drains to a soft, white, doughy mass having a water content of about 90%. This soft, doughy material is then pressed between porous surfaces, suitably papermaker's felts, to remove additional water. By this process the solids content may be brought to from 20% to 30% or higher.

These dewatered fibers are ready for combination with a collagen solution where an interlocked collagen fiber mass is to be prepared.

Where the fibers are to be employed in a smoke filter the fibers are dried, preferably by solvent or freeze drying techniques. A suitable solvent drying system may utilize one or more baths of acetone and a final bath of isopropanol. The solvent is removed from the fibrous material after removal from each of these baths by passing it through squeeze rolls or by centrifugation, and residual solvent after the final bath is removed by evaporating in air. It is possible to adjust the pH of these fibers in the course of this solvent drying treatment and it has been found desirable to adjust the pH to about 2.5 to 6, preferably pH 4 to 5, for use in smoke filters. The solvent or freeze dried fibers may then be fluffed and opened using, for example, a textile fiber opening device.

It is also possible to dry the fibers without solvent or freeze drying techniques by vacuum drying techniques, or by the technique of putting the water wet fibers from the squeeze rolls in a carding device and carding until the fibers are dry.

The dried product is a white, soft, fluffy, fibrous material with high specific area and good absorption characteristics.

It has been found that because of treatment of the aldehyde tanned skin material in an aqueous bath to disintegrate it into its fibers and the treatment of the resultant fibrous material to bring it to a pH for effective dewatering, the combined aldehyde content of the fibrous material is reduced and is preferably of the order of from about 0.3% to about 0.5% on a dry weight basis depending on the initial aldehyde content.

A further advantage is that while aldehyde tanning proceeds more rapidly at a relatively high pH, disintegration of the aldehyde treated skin material into relatively long fibers is achieved most effectively at a pH near neutral. The reason for the more rapid disintegration at this pH is not entirely clear but it may be that it is due to a balancing of conditions between a high pH at which bonds between fibers are softened and readily sundered, and a lower pH at which the individual fibers are more resistant to water so that the disintegration bath does not become gummy. Reduction of the fiber and bath in which it is suspended to a pH of from 4 to 5.5 brings the bath and fibers to a value approaching the isoelectric range of the treated fibers. In this range the fibers exhibit their greatest tendency to separate from water so that dewatering is carried out in the least possible time and with the greatest possible completeness.

The following examples are given to aid in understanding the invention and it is to be understood that the invention is not limited to the materials, reagents or procedural details of the examples:

*Example 1*

43 lbs. of pickled splits were placed in a rotating drum (12 r.p.m.) in a solution of the following composition: 120 lbs. water, 12 lbs. sodium chloride, and 4.4 lbs. trisodium phosphate. The drumming was continued for 3 hrs. at the end of which time 250 ml. of 4 N sodium hydroxide was added. Periodic drumming in which the drum was rotated 7 minutes out of 20 was continued overnight with addition of 4 N sodium hydroxide solution to maintain an alkaline condition. After 24 hrs. the pH was stable at pH 9.2. At this time 700 ml. of a 37% solution of formaldehyde was added. Reaction of the formaldehyde with the hide material reduced the pH and further 4 N sodium hydroxide solution was added with intermittent drumming. On the following day the pH had stabilized at about 7.9. The formaldehyde treated material was washed with running water in the drum for a period of about ½ hr. and thereafter drained. The drained material was chopped into pieces of about ¾" dimensions in a rotary powered chopper (Alsteele rotary knife cutter). The chopped material weighed about 78 lbs.

39 lbs. of the chopped material was introduced into a Hollander paper beater along with 157 lbs. of water. The beater was set in operation. After about 8 minutes the pH of the material in the beater was about 8.4 and this was adjusted to a pH of 6.4 by addition of 50 ml. of concentrated hydrochloric acid. The beater was operated to beat the material for about 50 minutes. At the end of this time the beaten material was a uniform suspension of long silky hide fibers. The suspension of hide fibers was adjusted to a pH of about 4 by addition of 300 ml. of concentrated hydrochloric acid in small portions with stirring. The material was then drained on a 20 mesh screen. The liquid drained from the fibrous mass leaving a white doughy material and this doughy material was then passed between tightly pressed rolls to remove water. At this point the formaldehyde content of the fibers was about 0.56% on a dry solids basis; and the dry solids content of the pressed mass was about 30% by weight. The pressed fiber mass was then immersed in acetone and squeezed to remove wet acetone three times to extract water from the mass. After removal from the third acetone extraction the fiber mass was transferred to a bath of isopropanol. The fibers were removed from the isopropanol, squeezed to remove free isopropanol and carded on a carding machine which both allowed evaporation of the isopropanol and reduced the fibrous mass to a fluffy condition. Portions of the fluffy mass were used as the filter mass in filter cigarettes to remove tars and nicotine, the filtered smoke having an excellent flavor.

*Example 2*

The procedure of Example 1 was followed to form a uniform suspension of long silky hide fibers. The suspension was adjusted to a pH of about 5 by addition of 150 ml. of concentrated hydrochloric acid in small portions with stirring. The material was then drained on a 20 mesh screen. The liquid drained freely from the fibrous mass leaving a white doughy material and this doughy material was passed between tightly pressed rolls to remove water. At this point the formaldehyde content of the fibers was about 0.57% on a dry solids basis; and the dry solids content of the pressed mass was about 30% by weight.

The mass of fibers was suitable for combination with a collagen solution for the manufacture of animal skin-like masses such as described in the application of John H. Highberger and Robert A. Whitmore referred to above.

*Example 3*

30 lbs. of pickled splits were placed in a rotating drum (13 r.p.m.) in a solution of the following composition: 60 lbs. of water, 1 kg. of glacial acetic acid and ½ kg. of sodium hydroxide. Drumming was continued for 22 hrs. with occasional addition of sodium hydroxide to raise the pH of the splits from an initial pH of 4.2 to a pH of 5.1. At the end of the 22 hrs. drumming there were added 600 ml. of 25% by weight aqueous solution of glutaraldehyde. Drumming was continued for 23 hrs. keeping the pH near 5. At the end of this time the splits were examined and appeared uniformly tanned but on testing it was found that the tanning was insufficient for good separation into fibers in a beater. The splits were removed from the liquid in the drum and placed in a rotating drum (13 r.p.m.) in a solution of the following composition: 60 lbs. of water, 1 kg. trisodium triphosphate, 165 ml. phosphoric acid (98%) and 800 ml. of a 25% by weight aqueous solution of glutaraldehyde. Drumming was continued for 28 hrs. and the pH of the material in the drum stayed at 5.9.

The splits were removed from the drum, washed in running water and thereafter drained. The drained material was chopped into pieces of about ¾" dimensions in a rotary powered chopper (Alsteele rotary knife cutter). The chopped material was then introduced into a Jones paper beater with water to make a 200 lb. load. The pH of the material in the beater was about 6.15. After beating for one hour the splits were reduced to a uniform suspension of long silky fibers. The suspension of fibers was adjusted to a pH of 5.1 by addition of 50 ml. of phosphoric acid (98%). The material was then drained on a 20 mesh screen. The liquid drained freely from the fibrous mass leaving a doughy material and this doughy material was then passed between tightly pressed rolls to remove water. The dry solids content of the pressed mass was about 25.7% by weight.

The mass of fibers was suitable for combination with a collagen solution for the manufacture of animal skin-like masses such as described in the application of John H. Highberger and Robert A. Whitmore referred to above.

Having thus described our invention, what we claim as new and desire to secure by Letters Patent of the United States is:

1. In a method for preparing collagen fibers from skin including the steps of reacting the skin in water with an aldehyde to give to the skins a chemically combined aldehyde content of from about .15% to about 1.0% based on the dried weight of the skin, subjecting said skin to shearing force in water between relatively moving surfaces to tease said skin into fibers and disperse said fibers in water and separating the collagen fibers from a major portion of the water of the resulting dispersion, the improvement which consists in bringing the pH of the skin and water to a pH of from about pH 5 to about pH 8 for the step of subjecting the skin to shearing force and bringing the pH of said dispersion to a pH of from about pH 4 to about pH 5.5 for separating the collagen fibers from the water of said dispersion.

2. The method as defined in claim 1 in which the aldehyde is formaldehyde, the skin solids in the material subjected to shearing force is from 1% to 8% and the pH in the shearing operation is from about pH 5 to about pH 7, and in which the pH of the dispersion of fibers is adjusted to from about pH 4.8 to about pH 5.3 for the separation of the collagen fibers from water of said dispersion.

References Cited in the file of this patent

UNITED STATES PATENTS 2,934,447     Highberger _____ Apr. 16, 1960